United States Patent Office 2,837,450
Patented June 3, 1958

2,837,450

METHOD OF BONDING PARTS OF LIGHT ALLOY HEAT EXCHANGERS

Donald C. Moore, Sutton Coldfield, and Dennis A. Edge, Kings Norton, Birmingham, England, assignors to Imperial Chemical Industries Limited, a corporation of Great Britain No Drawing. Application October 26, 1953
Serial No. 388,435

Claims priority, application Great Britain
October 27, 1952

9 Claims. (Cl. 148—21.91)

This invention relates to the manufacture of light alloy heat exchanger apparatus and more particularly to the application therein of improved alloys to facilitate the construction of the apparatus and to provide assemblies having superior mechanical properties.

In the manufatcure of light alloy heat exchangers fusion welding and brazing techniques utilising aluminium-silicon alloy filler materials are generally employed. The heat exchangers consist of a matrix wherein heat transfer takes place from one medium to another and ancillary fittings for conveying the two media to the matrix. The matrix comprises a series of closely separated channels in which the respective media flow, the boundary wall of the channels being made from light gauge material to facilitate heat transfer; the component parts of the matrix are joined together preferably by flux dip brazing, the aluminium-silicon alloy containing 5–10% silicon which forms the joints being either incorporated as a pre-clad coating on the actual material or introduced separately during assembly in the form of shims or wire. The ancillary fittings, which must be as light as possible, are constructed by fusion welding, and these are integrated with the matrix by torch brazing involving the use of aluminum-silicon alloy filler material containing between 5 and 14% silicon.

In view of the high temperatures involved in brazing processes using aluminium-silicon alloy filler materials only those aluminium alloys having high solidus temperatures can be satisfactorily employed for the component parts of the heat exchanger. Alloys with sufficiently high melting points contain very little alloying element and in consequence are generally low in strength. This is a serious drawback since heat exchangers, particularly those for use in aircraft, must be as light as possible and at the same time able to withstand the high stress levels characteristic of service conditions.

The type of alloys which would appear most promising for meeting the requirements for brazed heat exchangers are the aluminium/magnesium/silicon alloys, which have a relatively low degree of alloying and yet are amenable to hardening heat treatment, but the range of alloys of the type at present finding use in industry, conforming to material HS 10 in British Standard Specification No. 1470/1948 of which the main constituents are magnesium 0.4–1.5%, silicon 0.75–1.3%, manganese 0–1.0%, titanium 0–0.2%, are susceptible to hot-short cracking and intergranular attack during flux dip brazing due to incipient melting. They are also susceptible to hot-short cracking during torch brazing and fusion welding.

The object of the present invention is to enable heat exchangers to be satisfactorily fabricated from heat-treatable aluminium base alloys by the use of brazing operations, and we have found that by the use of specially selected and modified compositions of aluminium/magnesium/silicon alloys this object can be achieved.

According to the present invention we provide a method of manufacture of heat exchangers of the kind described which comprises forming the matrix components from an alloy containing 0.35–0.55% magnesium, 0.35–0.55% silicon, 0–0.35% titanium, 0–1% manganese, balance aluminium, bonding the said components by a brazing process employing aluminium-silicon alloy brazing material, forming the ancillary parts of the heat exchanger from an alloy containing 0.5–1.0% magnesium, 0.75–1.25% silicon, 0.2–0.35% titanium, 0–1% manganese, balance aluminium, and brazing the said parts to the matrix. The invention also comprises subjecting the partially or completely assembled heat exchangers to heat treatment adapted to effect precipitation hardening of the constituent alloy or alloys.

The said alloys may contain up to 0.5% commercial impurities other than silicon, although the impurity content should preferably not exceed 0.4%.

The matrix components are preferably bonded by flux dip brazing, but furnace brazing may also be employed. They are also preferably formed from the appropriate sheet, strip or other material provided with a pre-clad adherent coating of aluminium-silicon brazing alloy containing 5–10% silicon.

Preferably the binary brazing alloys are employed, but if desired aluminium-silicon alloys containing small proportions of zinc, copper or nickel may also be used.

The above-mentioned alloys from which, in accordance with the invention, the ancillary parts are formed have in addition to their good brazing properties considerably less susceptibility to hot-short cracking during fusion welding than material HS 10 of B. S. 1470/1948, which thus facilitates the initial fabrication of these components.

After completion of the assembly and joining operations the heat exchangers in accordance with the invention may be strengthened by appropriate heat treatment. This consists in heating at temperatures and for times requisite to dissolve the majority of the compound responsible for the age-hardening phenomenon in aluminium/magnesium/silicon alloys, and subsequently quenching or otherwise cooling sufficiently rapidly to retain it in solution. Such quenching may be carried out in cold water, suitable precautions being taken to prevent distortion, or sufficiently rapid quenching may be achieved using hot water, water sprays or air blasts whereby the tendency to distortion can be reduced to a minimum. Subsequently the heat-exchangers may be allowed to age-harden at room temperature, although much improved mechanical properties result if ageing is carried out at suitable elevated temperature.

Typical mechanical properties obtainable with alloys within the compositional ranges hereinbefore specified after the heating cycles involved in the joining operations and subsequent solution treatment for ½ hour at 525° C., quenching in cold water and ageing for 18 hours at 160° C. are as follows:

| | Matrix alloy | Alloy for ancillary fittings |
|---|---|---|
| 0.1% Proof Stress, Tons/in.² | 12 | 19 |
| Ult. Tensile strength, Tons/in.² | 15 | 21 |
| Elongation, percent on 2 in. | 10 | 10 |
| Vickers Hardness | 90 | 125 |

(The elongation value for the alloy for the fittings is liable to be rather lower near the joints.)

Alternatively, since it is in the matrices of heat-exchangers where high strength is mainly required, a simplified heat-treatment cycle may be carried out for strengthening these parts of the assemblies only. This consists in quenching the matrix immediately after immersion in the flux dip brazing bath and then ageing either naturally or artificially after the ancillary parts of the heat exchanger have been incorporated. The heating involved in the brazing of these ancillary parts destroys the effect of the quenching treatment in the immediate neighbourhood of the joints, but the remainder of the matrix remains largely unaffected and responds to subsequent ageing treatments.

We claim:

1. Method of manufacture of heat exchangers of the kind comprising a matrix wherein heat transfer takes place from one medium to another and ancillary fittings for conveying the two media to the matrix, which comprises forming the matrix components from an alloy containing 0.35–0.55% magnesium, 0.35–0.55% silicon, 0–0.35% titanium, 0–1% manganese, balance aluminum, bonding the said components by a brazing process employing aluminium-silicon alloy brazing material, forming the ancillary parts of the heat exchanger from an alloy containing 0.5–1.0% magnesium, 0.75–1.25% silicon, 0.2–0.35% titanium, 0–1% manganese, balance aluminium, and brazing the said parts to the matrix.

2. Method in accordance with claim 1, in which the matrix alloy contains 0.2–0.35% titanium.

3. Method in accordance with claim 1, in which the matrix components are formed from material provided with a pre-clad adherent coating of aluminium-silicon brazing alloy containing 5–10% silicon.

4. Method in accordance with claim 3, in which the brazing alloy contains in addition small proportions of a member of the group consisting of zinc, copper and nickel.

5. Method in accordance with claim 1, in which after completion of the assembly and joining operations the heat exchanger is subjected to precipitation hardening heat treatment.

6. Method in accordance with claim 5, in which the heat treatment comprises solution heat treatment followed by age-hardening at not less than room temperature.

7. Method in accordance with claim 1, in which the matrix after brazing is immediately quenched and then aged after the ancillary parts of the heat exhanger have been incorporated.

8. A heat exchanger wherein heat transfer takes place from one medium to another comprising a matrix constructed of an alloy containing 0.35–0.55% magnesium, 0.35–0.55% silicon, 0–0.35% titanium, 0–1.0% manganese, balance aluminium; and ancillary fittings connected to said matrix, said ancillary fittings being formed from an alloy containing 0.5–1.0% magnesium, 0.75–1.25% silicon, 0.2–0.35% titanium, 0–1.0% manganese, and balance aluminium.

9. The article as defined in claim 8 wherein the matrix alloy contains 0.2–0.35% titanium.

References Cited in the file of this patent

UNITED STATES PATENTS 2,602,413  Miller _____ July 8, 1952
2,695,253  Schaaber _____ Nov. 23, 1954

OTHER REFERENCES

"Survey of Welding of Aluminum and Magnesium," PB 78712, pp. 23–27.